(12) United States Patent
Suzuki et al.

(10) Patent No.: US 6,558,140 B2
(45) Date of Patent: May 6, 2003

(54) MOTOR OF AIR CONDITIONING SYSTEM AND AIR CONDITIONING SYSTEM HAVING THE SAME

(75) Inventors: Akihiko Suzuki, Toyohashi (JP); Yasushi Ueda, Toyohashi (JP); Mineo Yamaguchi, Obu (JP)

(73) Assignee: Asmo Co., Ltd., Shizuoka (JP)

( * ) Notice: Subject to any disclaimer, the term of this patent is extended or adjusted under 35 U.S.C. 154(b) by 7 days.

(21) Appl. No.: 09/977,235

(22) Filed: Oct. 16, 2001

(65) Prior Publication Data

US 2002/0051718 A1 May 2, 2002

(30) Foreign Application Priority Data

Nov. 1, 2000 (JP) ......................... 2000-334660

(51) Int. Cl.[7] ............................ F04B 17/00; F04B 35/04
(52) U.S. Cl. ................ 417/423.1; 417/423.7; 417/423.9
(58) Field of Search .................. 417/423.1, 423.7, 417/423.11, 423.12, 423.14, 423.15, 424.2, 424.1, 423.9

(56) References Cited

U.S. PATENT DOCUMENTS

| 4,218,196 A | * | 8/1980 | Ohnishi ................... 417/423.7 |
| 4,752,194 A | * | 6/1988 | Wienen et al. ............. 417/420 |
| 5,915,931 A | * | 6/1999 | Lindner et al. ............. 417/420 |
| 6,037,688 A | * | 3/2000 | Gilliland et al. ............. 310/89 |
| 6,382,936 B1 | * | 5/2002 | Schuler et al. ........... 417/423.1 |
| 6,422,831 B1 | * | 7/2002 | Ito et al. ..................... 417/269 |
| 6,478,555 B1 | * | 11/2002 | Kim et al. .................. 417/420 |

FOREIGN PATENT DOCUMENTS

| JP | A-58-103843 | 6/1983 |
| JP | A-5-130755 | 5/1993 |
| JP | A-5-130756 | 5/1993 |
| JP | 5-91923 U | 12/1993 |
| JP | A-11-332200 | 11/1999 |
| JP | A-11-332220 | 11/1999 |

* cited by examiner

Primary Examiner—Charles G. Freay
Assistant Examiner—William H. Rodriguez
(74) Attorney, Agent, or Firm—Posz & Bethards, PLC

(57) ABSTRACT

A motor drives a fan that creates airflow in an air conditioning system. The motor includes a cup-shaped motor holder and a yoke received inside of the motor holder. The motor holder has a peripheral wall and an open end at one end of the peripheral wall. The yoke has an open end adjacent to the open end of the motor holder. The open end of the yoke has a flange that extends radially outwardly. An outer peripheral end of the flange is positioned radially outward of the peripheral wall of the motor holder.

12 Claims, 4 Drawing Sheets

MOTOR OF AIR CONDITIONING SYSTEM AND AIR CONDITIONING SYSTEM HAVING THE SAME

CROSS REFERENCE TO RELATED APPLICATION

This application is based on and incorporates herein by reference Japanese Patent Application No. 2000-334660 filed on Nov. 1, 2000.

BACKGROUND OF THE INVENTION

1. Field of the Invention

The present invention relates to a motor of a vehicle air conditioning system and also to the vehicle air conditioning system having the same. More particularly, the present invention relates to a waterproof structure of a blower motor that rotates a fan of the vehicle air conditioning system.

2. Description of Related Art

With reference to FIG. 4, in one previously proposed air conditioning system, air is blown out through each corresponding air outlet opening 23 of an air conditioning duct 20 arranged in a vehicle when a blower motor 21 arranged in the air conditioning duct 20 is driven to rotate a fan 22. The fan 22 draws either internal air from a vehicle interior or external air from an engine room depending on a switching operation of internal/external air switching damper 24 arranged in the air conditioning duct 20. The air drawn by the rotation of the fan 22 is adjusted to a predetermined temperature by heat exchange through an evaporator 25, a heater core 26 and an air mixing damper 27, which are all arranged in the air conditioning duct 20. Then, the air is blown out through each corresponding air outlet opening 23 based on a position of each air outlet opening switching damper 28 arranged in the air conditioning duct 20.

In the above air conditioning system, for example, when the vehicle is washed with a vehicle washing machine or the like that uses pressurized vigorous water to wash the vehicle, it may happen that water droplets penetrate into the air conditioning duct 20 through an external air inlet opening of the air conditioning duct 20 communicated with the engine room for taking the external air. The water penetrated into the air conditioning duct 20 may be forced to move to a motor holder 29, which holds the blower motor 21, along an internal wall surface of the air conditioning duct 20 or to move directly to the motor holder 29. This water may then penetrate into an interior of the motor 21 through an upper open end of the motor holder 29 due to a negative pressure generated by the rotation of the fan 22 connected to a rotatable shaft of the blower motor 21, i.e., due to the airflow directed toward the motor 21.

When the water penetrates into the interior of the blower motor 21, the rotatable shaft of the motor 21, bearings for supporting the rotatable shaft of the motor 21 or the like may be rusted, causing the phenomenon known as "motor locking" that reduces a rotational efficiency of the rotatable shaft.

To address the above disadvantage, in Japanese Unexamined Patent Publication No. 5-130756, there is disclosed a bent portion that is formed by radially outwardly bending an outer peripheral wall surface of an upper open end of the motor holder 29. With this arrangement, even if the airflow directed toward the motor 21 upon rotation of the fan 22 is created, the vent portion can effectively prevent the airflow from passing through the vent portion along the outer peripheral wall surface of the motor holder 29. That is, the water drawn through the external air inlet opening due to the negative pressure generated by the rotation of the fan 22 is prevented from moving upward along the outer peripheral wall surface of the motor holder 29 and also from getting into the interior of the motor 21 beyond the upper open end of the motor holder 29.

The motor holder 29 is generally formed of a resin material. When the bent portion is formed at the upper end of the motor holder 29, it is difficult to remove the motor holder 29 from its molding die upon completion of molding of the motor holder 29. Thus, it is difficult to integrally form the motor holder 29 and the bent portion together. As a result, the motor holder 29 and the bent portion need to be separately formed. When such a waterproof structure is formed separately from motor holder 29, the number of the components to be assembled is increased, thereby causing an increase in manufacturing costs.

SUMMARY OF THE INVENTION

The present invention addresses the above disadvantages. Thus, it is an objective of the present invention to provide a motor of a vehicle air conditioning system capable of restraining penetration of water into an interior of the motor and thereby restraining deterioration of motor performance. It is another objective of the present invention to provide an air conditioning system having such a motor.

To achieve the objectives of the present invention, there is provided a motor for driving a fan that creates airflow in an air conditioning system. The motor includes a cup-shaped motor holder and a yoke received inside of the motor holder. The motor holder has a peripheral wall and an open end at one end of the peripheral wall. The yoke has an open end adjacent to the open end of the motor holder. The open end of the yoke has a flange that extends radially outwardly. An outer peripheral end of the flange is positioned radially outward of the it peripheral wall of the motor holder.

Furthermore, there is also provided an air conditioning system having the above motor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to FIGS. 1 to 3.

Figure 1:
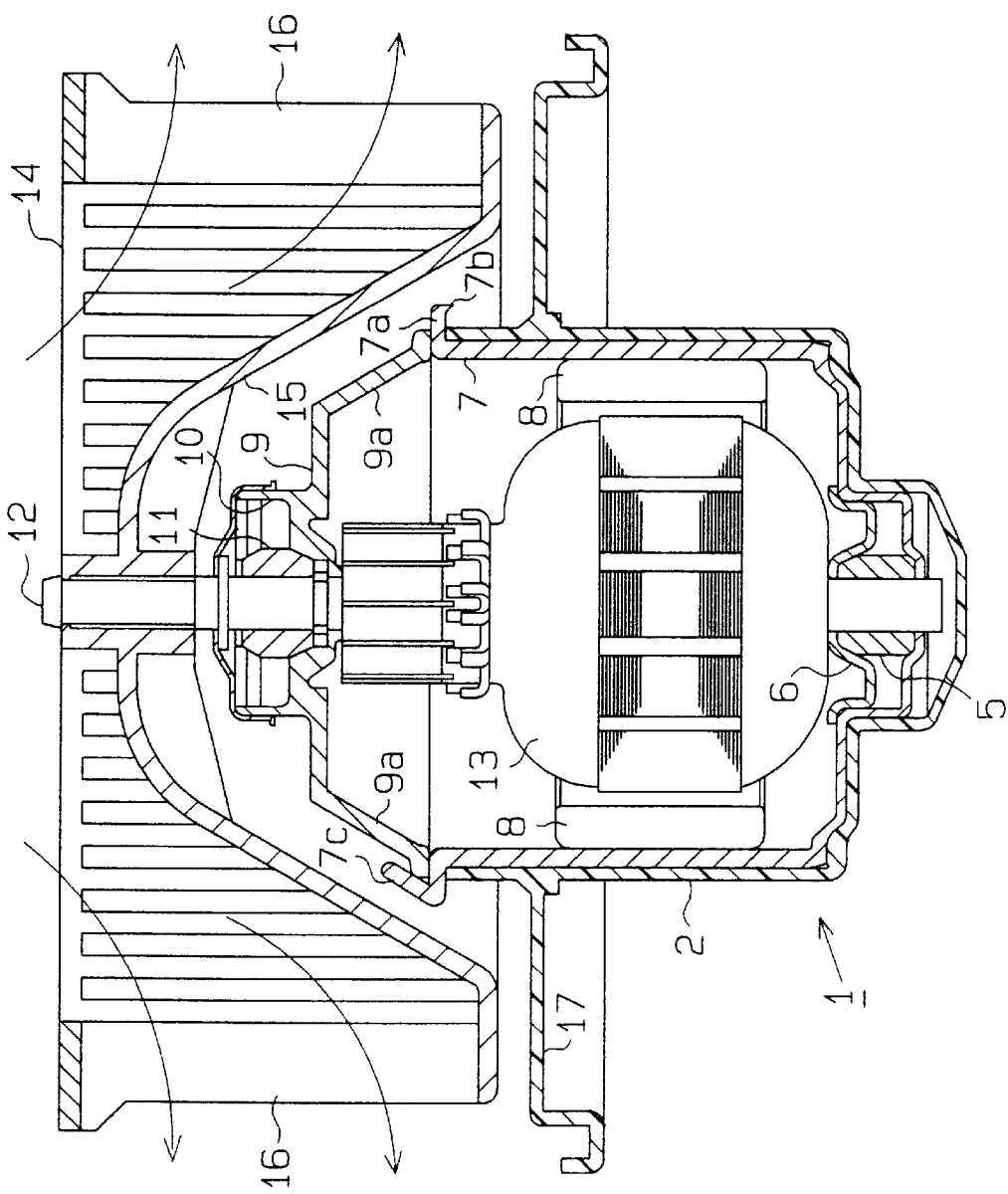
FIG. 1 is a cross-sectional view of a blower motor to which a fan is secured according to an embodiment of the present invention.

With reference to FIG. 1, a blower motor 1 acting as a motor of a vehicle air conditioning system has a motor holder 2. The motor holder 2 is made of a resin material and is shaped into a cup shape. A yoke 7 that forms a magnetic circuit is made of a metal material and is retained along an inner peripheral surface of the motor holder 2. The yoke 7 is formed into a cup is shape through a deep-drawing process. A lower bearing 5 is arranged at a base of the yoke 7. Furthermore, a support plate 6 is provided at the base of the yoke 7 to support an upper portion of the lower bearing 5.

A plurality of magnets 8 are secured to an inner peripheral surface of the yoke 7. Furthermore, an upper end portion of the yoke 7 is bent radially outwardly to form a yoke flange 7a, which extends along an entire perimeter of the upper end portion of the yoke 7 and acts as a flange of the present invention. The yoke 7 is retained by the inner peripheral surface of the motor holder 2 while a lower surface of the yoke flange 7a abuts against an upper end of the motor holder 2. An outer diameter of the yoke flange 7a is larger than an outer diameter of the motor holder 2.

The yoke flange 7a is formed simultaneously when the metal yoke 7 is formed through the press working (deep-drawing process). With reference to FIG. 3, when the yoke flange 7a is formed, a return burr(s) 7b acting as a return portion of the present invention is formed at an outer peripheral edge (or outer peripheral end) of the lower surface of the yoke flange 7a to extend vertically downwardly or in a direction away from a fan 14, which will be described in greater detail below. The return burr 7b is positioned radially outward of a peripheral wall of the motor holder 2.

An end plate 9 is arranged above the yoke 7. The end plate 9 has three legs 9a that are spaced at substantially equal angular intervals and extend downwardly. A distal end of each leg 9a 15, is supported by an upper surface of the yoke flange 7a. More specifically, three supporting portions 7c are arrange at substantially equal angular intervals along the yoke flange 7a.

Each supporting portion 7c is formed by upwardly bending a corresponding outer portion of the yoke flange 7a. The three legs 9a are supported by the three supporting portions 7c, respectively, so that the end plate 9 is secured to the yoke 7. In the present embodiment, although the three legs 9a are formed, the number of the legs 9a is not limited to three and can be any appropriate number.

A recess 10 is formed at the center of the upper surface of the end plate 9, and an upper bearing 11 is provided at the center of the recess 10. A rotatable shaft 12 is rotatably supported in the motor holder 2 by the lower bearing 5 and the upper bearing 11. An upper end portion of the rotatable shaft 12 protrudes upwardly from the end plate 9.

A rotor 13 is secured about a portion of the rotatable shaft 12 located between the upper bearing 11 and the lower bearing 5. When the rotor 13 is excited by a control device (not shown) through brushes (not shown), the rotatable shaft 12 rotates integrally with the rotor 13.

The fan 14 is secured to the upper end portion of the rotatable shaft 12 that protrudes upwardly from the end plate 9. The fan 14 has a bottom surface 15 and fins 16. The bottom surface 15 covers the upper side of the end plate 9, and the fins 16 are spaced at substantially equal angular intervals and extend upwardly from an outer peripheral portion of the bottom surface 15. The upper ends of the fins 16 are connected together. When the rotor 13 is excited, and thereby the rotatable shaft 12 is rotated, the fan 14 is also rotated to generate airflow directed from a top side of the fan 14 toward a respective lateral side of the fan 14, as indicated with solid arrows in FIG. 1.

A holder flange 17 extends outwardly from a middle portion of an outer peripheral surface of the peripheral wall of the motor holder 2. As shown in FIG. 2, the holder flange 17 is retained within an air conditioning duct 18 arranged in a vehicle interior to secure the blower motor 1.

Operation of the blower motor 1 will be described below.

Figure 2:
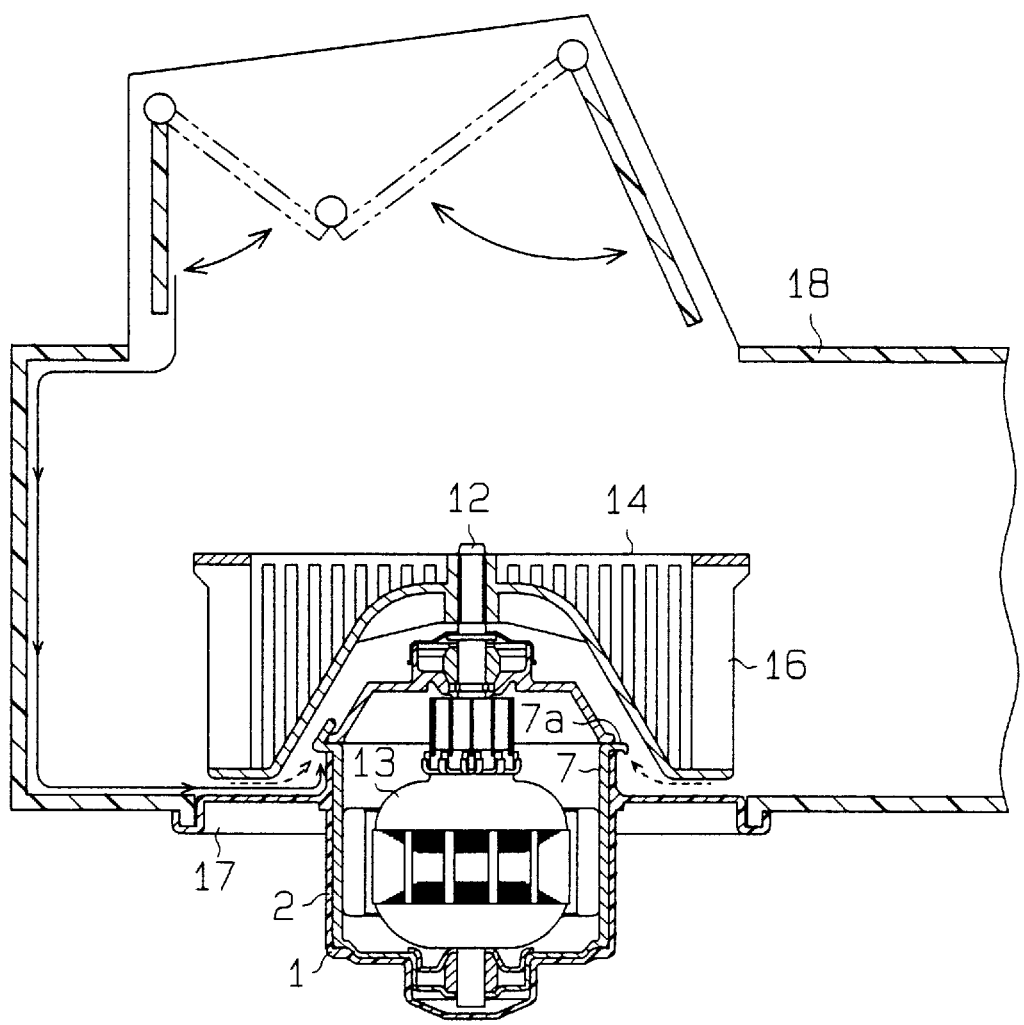
FIG. 2 is a partial cross-sectional view showing the blower motor arranged in an air conditioning duct.
Figure 3:
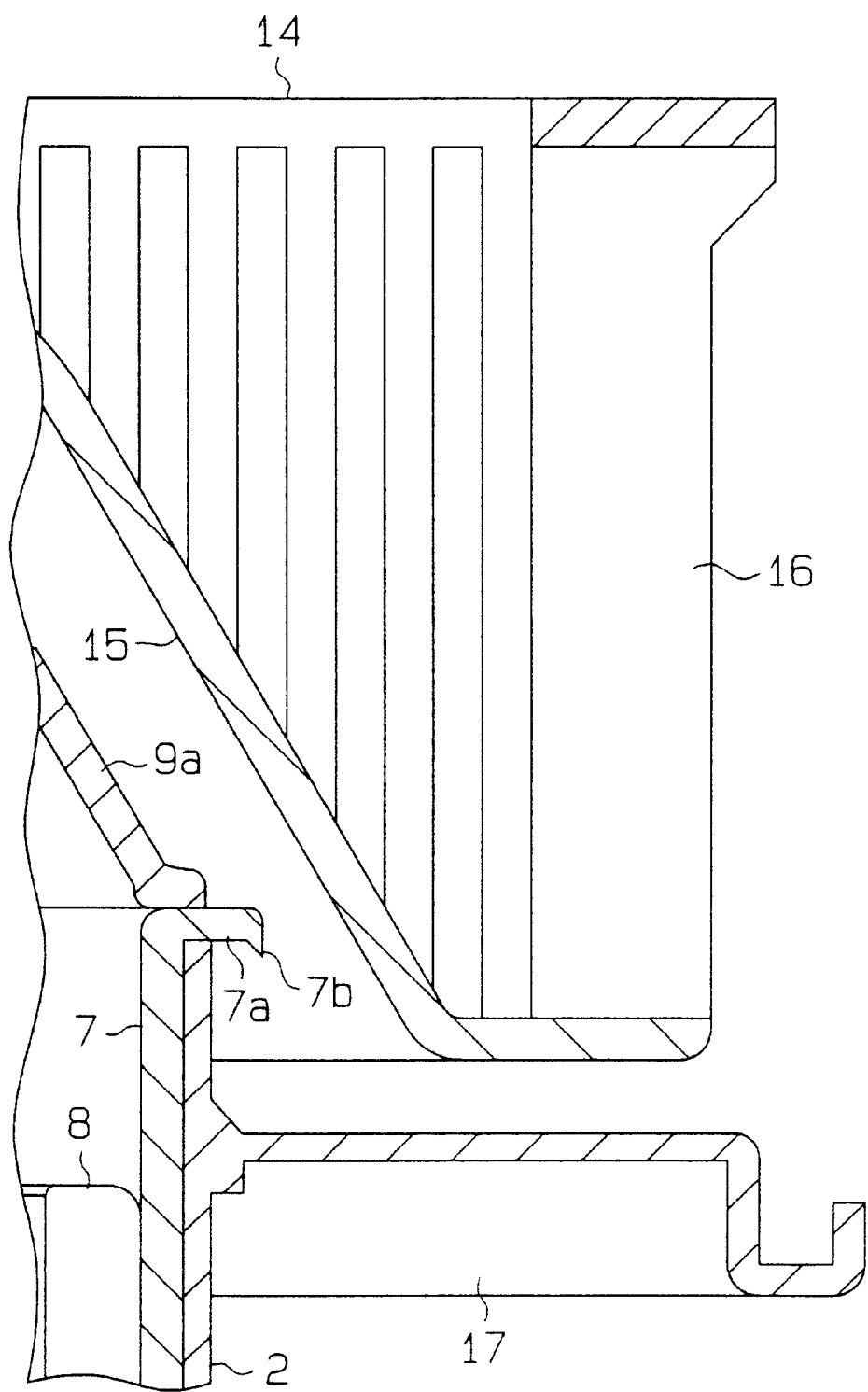
FIG. 3 is a partial enlarged cross-sectional view showing a return burr of a yoke of the blower motor.
Figure 4:
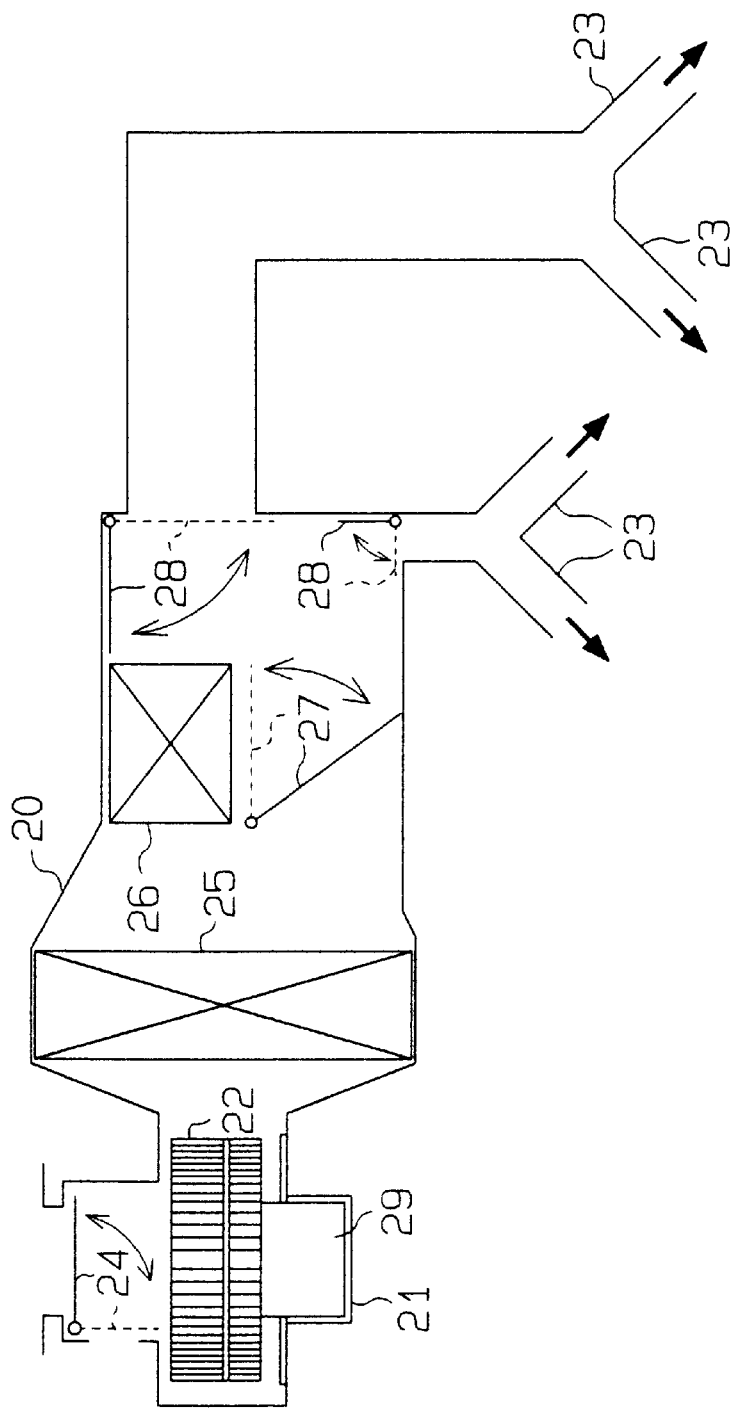
FIG. 4 is a schematic cross-sectional view showing a previously proposed blower motor arranged in an air-conditioning duct.

As shown in FIG. 2, when the fan 14 rotates while the holder flange 17 of the blower motor 1 is secured to the air conditioning duct 18, the air drawn by the fan 14 flows through the evaporator 25 and the heater core 26, which together constitute a heat exchanging device of the present invention, and is thereby adjusted to a predetermined temperature. Thereafter, the air is outputted from each corresponding air outlet opening 23.

At this stage, if water (in a form of droplets, mists or the like) or other fluid is drawn through an external air inlet opening of the air conditioning duct 18, the water or fluid flows along an inner surface of the air conditioning duct 18 and reaches the holder flange 17 of the motor holder 2, as indicated with an arrowed solid line in FIG. 2. Due to the rotation of the fan 14, the airflow (negative pressure) directed toward the motor holder 2 is created between the fan 14 and the holder flange 17, as indicated with dotted arrows. Thus, because of the negative pressure, the water on the upper surface of the holder flange 17 is forced to flow upwardly along the outer peripheral wall surface of the motor holder 2 and reaches the upper end of the motor holder 2.

Then, this water is forced to pass over the upper end of the motor holder 2 into the interior of the blower motor 1 but is prevented from passing over the upper end of the motor holder 2 by the lower surface of the yoke flange 7a that overhangs the upper end of the motor holder 2. Thus, the penetration of the water into the interior of the blower motor 1 is effectively restrained. Even if the negative pressure reaches an abnormally high level and thereby causes the water to flow horizontally along the lower surface of the yoke flange 7a, this water is prevented from flowing toward the upper surface of the yoke flange 7a by the return burr 7b formed at the outer peripheral edge or outer peripheral end of the lower surface of the yoke flange 7a located radially outward of the peripheral wall of the motor holder 2. Thus, the water cannot reach the upper surface of the yoke flange 7a.

The blower motor 1 constructed in the above manner provides the following advantages.

(1) At the upper end portion of the yoke 7, there is provided the yoke flange 7a that extends radially outwardly and overhangs the upper end of the motor holder 2. Thus, even if the water that has penetrated into the air conditioning duct 18 is forced to flow upwardly along the outer peripheral wall surface of the motor holder 2 due to the negative pressure generated by the rotation of the fan 14, this water is prevented from penetrating into the interior of the motor holder 2 and the yoke 7 beyond the upper end of the motor holder 2. Thus, generation of the rusts on the upper bearing 11, the lower bearing 5 and/or the rotatable shaft 12 received in the motor holder 2 is well restrained, and thereby the motor locking phenomenon that reduces the rotational efficiency of the rotatable shaft 12 can be restrained.

(2) The return burr 7b that projects downwardly is formed at the outer peripheral edge of the lower surface of the yoke flange 7a. Thus, even if the negative pressure generated by the rotation of the fan 14 reaches the abnormally high level and thereby causes the water to flow horizontally along the lower surface of the yoke flange 7a, this water is prevented from flowing toward an upper surface of the yoke flange 7a by the return burr 7b and thereby cannot reach the upper surface of the yoke flange 7a. Thus, the penetration of the water into the interior of the motor holder 2 and the yoke 7 can be effectively restrained in the relatively simple manner.

(3) The yoke flange 7a that prevents the penetration of the water into the interior of the motor is formed simultaneously with manufacturing of the yoke 7 through the press working (deep-drawing process). Thus, an increase in the manufacturing cost caused by an increase in the number of the manufacturing steps can be effectively restrained, and the waterproof performance can be improved.

(4) The yoke flange 7a is integrally formed in the yoke 7. Thus, an increase in the number of the components is restrained, and thereby an increase in the manufacturing cost can be restrained.

The above embodiment can be modified as follows.

In the above embodiment, the yoke flange 7a is formed to extend parallel to the holder flange 17. Alternatively, the outer peripheral end of the yoke flange 7a can be bent to extend downwardly.

In the above embodiment, during the manufacturing of the yoke flange 7a, the return burr 7b acting as the return portion is formed at the outer peripheral edge of the lower surface of the yoke flange 7a. Alternatively, the return portion can be formed by bending downwardly the outer peripheral end of the yoke flange 7a at 90 degrees relative to the rest of the yoke flange 7a.

The return burr 7b can be eliminated if the penetration of the water into the interior of the motor holder 2 and the yoke 7 can be prevented by the yoke flange 7a alone by forming the yoke flange 7a in the following manner. That is, the yoke flange 7a is further extended to a point where the yoke flange 7a is spaced away from the bottom surface 15 of the fan 14 at radially outward of the peripheral wall of the motor holder 2, and thereby the water forced to flow along the outer peripheral wall surface of the motor holder 2 is prevented from moving from the lower surface of the yoke flange 7a to the upper surface of the yoke flange 7a by the yoke flange 7a.

Also, the approach of the water to the upper surface of the yoke flange 7a can be restrained by providing a groove that extends circumferentially in the lower surface of the yoke flange 7a. For example, the groove can be formed along the outer peripheral edge of the lower surface of the yoke flange 7a, so that an inner peripheral surface of the groove can act as the return portion.

Also, the return burr or return portion can be formed at a distal end (top end in FIG. 1) of each retaining portion 7c of the yoke 7.

Additional advantages and modifications will readily occur to those skilled in the art. The invention in its broader terms is therefore, not limited to the specific details, representative apparatus, and illustrative examples shown and described.

What is claimed is:

1. A motor for driving a fan that creates airflow in an air conditioning system, said motor comprising:

a cup-shaped motor holder having a peripheral wall and an open end at one end of said peripheral wall; and a yoke received inside of said motor holder, said yoke having an open end adjacent to said open end of said motor holder, said open end of said yoke having a flange that extends radially outwardly, an outer peripheral end of said flange being positioned radially outward of said peripheral wall of said motor holder.

2. A motor according to claim 1, further comprising one or more return portions for returning fluid applied thereto, said one or more return portions extending in a direction away from said fan, at least one of said one or more return portions being integrally formed at said outer peripheral end of said flange.

3. A motor according to claim 2, wherein said one or more return portions extends vertically downwardly in a direction generally parallel to an axial direction of said motor.

4. A motor according to claim 1, wherein said flange is integrally formed with said yoke by press working.

5. A motor according to claim 1, wherein said flange extends circumferentially along an entire perimeter of said open end of said yoke.

6. A motor according to claim 2, further comprising an end plate connected to said open end of said yoke, said end plate having a plurality of legs, wherein:

said open end of said yoke has a plurality of retaining portions for retaining said legs of said end plate, respectively; and at least one of said one or more return portions is integrally formed at a distal end of at least one of said retaining portions, respectively.

7. An air conditioning system comprising a motor for driving a fan that creates airflow in said air conditioning system, said motor including:

a cup-shaped motor holder having a peripheral wall and an open end at one end of said peripheral wall; and a yoke received inside of said motor holder, said yoke having an open end adjacent to said open end of said motor holder, said open end of said yoke having a flange that extends radially outwardly, an outer peripheral end of said flange being positioned radially outward of said peripheral wall of said motor holder.

8. An air conditioning system according to claim 7, wherein said motor further including one or more return portions for returning fluid applied thereto, said one or more return portions extending in a direction away from said fan, at least one of said one or more return portions being integrally formed at said outer peripheral end of said flange.

9. An air conditioning system according to claim 8, wherein said one or more return portions extends vertically downwardly in a direction generally parallel to an axial direction of said motor.

10. An air conditioning system according to claim 7, wherein said flange is integrally formed with said yoke by press working.

11. An air conditioning system according to claim 7, wherein said flange extends circumferentially along an entire perimeter of said open end of said yoke.

12. An air conditioning system according to claim 8, wherein:

said motor further includes an end plate connected to said open end of said yoke, said end plate having a plurality of legs;

said open end of said yoke has a plurality of retaining portions for retaining said legs of said end plate, respectively; and at least one of said one or more return portions is integrally formed at a distal end of at least one of said retaining portions, respectively.

* * * * *